Oct. 13, 1959 — M. E. EVANS — 2,908,439
MULTIPLYING DEVICE
Filed Nov. 19, 1956 — 2 Sheets-Sheet 1

INVENTOR.
Melvin Eugene Evans
BY Chas. Denegre
Attorney.

Oct. 13, 1959

M. E. EVANS 2,908,439

MULTIPLYING DEVICE

Filed Nov. 19, 1956

2 Sheets-Sheet 2

INVENTOR.
Melvin Eugene Evans
BY Chas. Lenegre
Attorney.

United States Patent Office 2,908,439
Patented Oct. 13, 1959

2,908,439

MULTIPLYING DEVICE

Melvin Eugene Evans, Birmingham, Ala.

Application November 19, 1956, Serial No. 623,130

1 Claim. (Cl. 235—88)

This invention relates to a multiplying device. It has for its main objects to provide such a device that will be highly satisfactory for the purpose intended, simple in structure, easy to use and keep in working condition and very durable.

A further object is to provide such a device that will be educational as well as interesting and useful.

Other objects and advantages will appear from the drawings and description.

Figure 1:
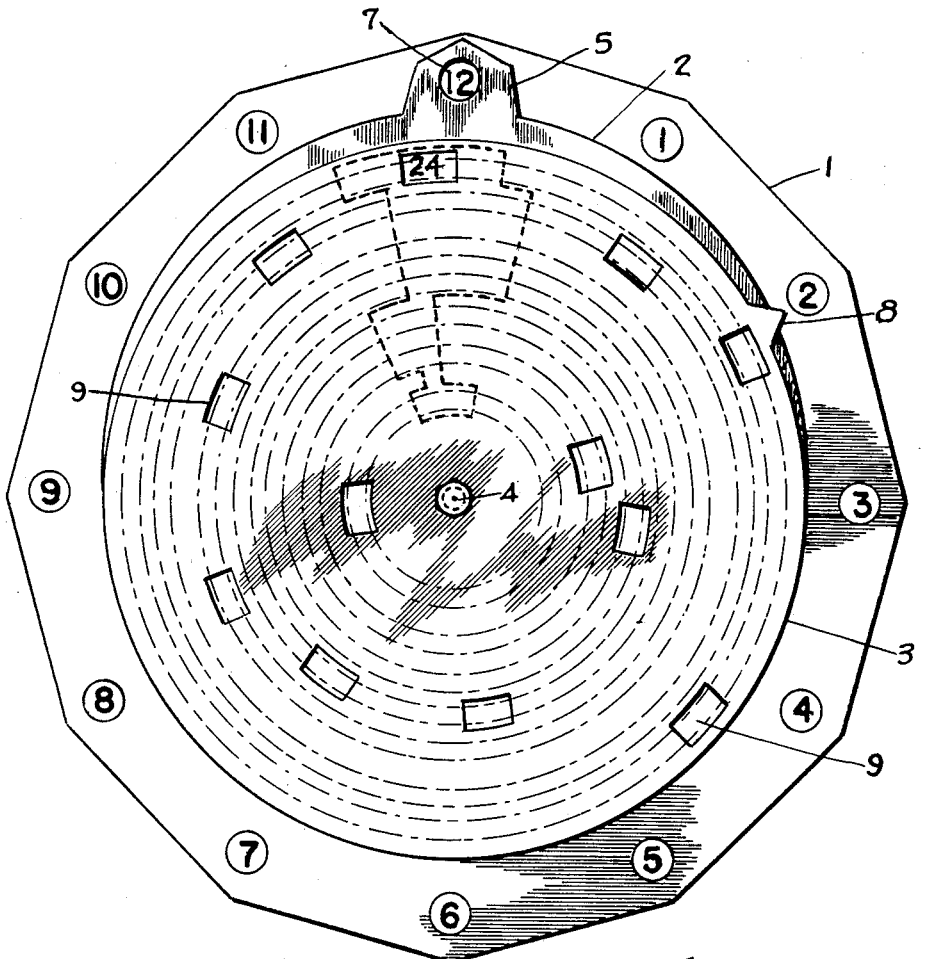
Figure 4:
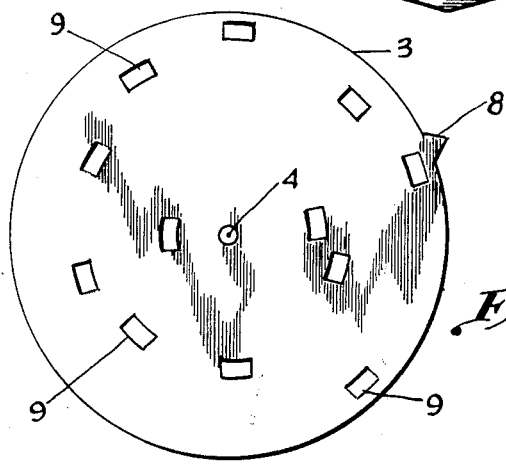
Figure 2:
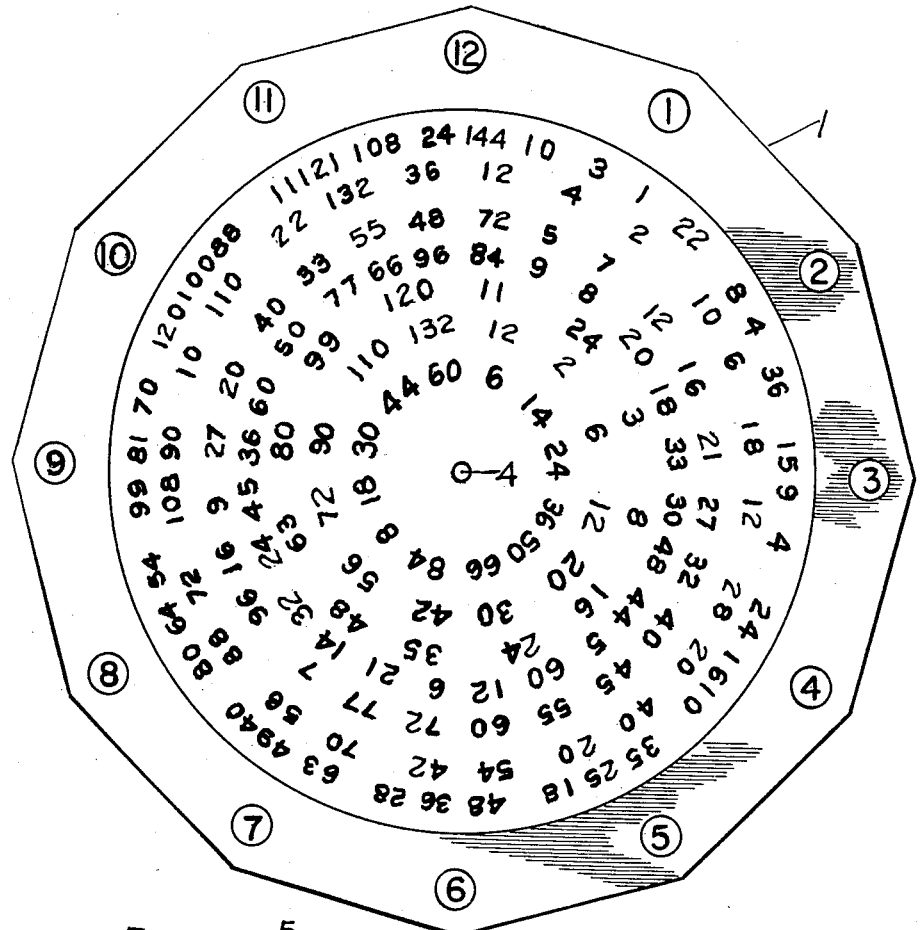
Figure 3:
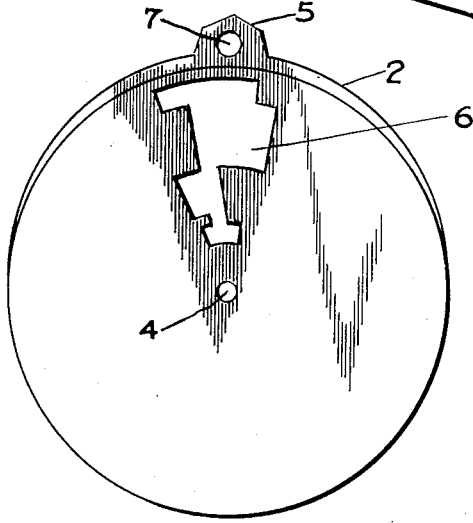

By referring generally to the drawings it will be observed that Fig. 1 is a plan view of the assembled multiplying device in condition for use consisting of its three parts; Fig. 2 is a plan view of the bottom or base member of the device; Fig. 3 is a plan view of the between member of the device; and Fig. 4 is a plan view of the top member of the device.

Similar reference numerals refer to similar parts throughout the several views.

Referring to the drawings in detail it will be seen that the device comprises three approximately round members 1, 2 and 3 that are held revolvably together by a small bolt 4 inserted through their centers. The base member 1 is provided with a plurality of numerals positioned circular around in its center portion with numerals 1 to 12 spaced evenly apart around on its outer portion. A second or between member 2 that is round except having pointed portion 5 integral with its outer edge. An opening 6 as a window is formed in this member and is positioned between the pointed portion and the center of the member. The pointed portion has a round hole 7 as a window for viewing the numerals from 1 to 12 on the outer portion of the base member 1. The top member 3 is round except for a comparatively small point 8 integral with its circumference edge and is adapted to indicate the numerals 1 to 12 on the outer portion on the base member 1. A plurality of openings 9 as windows are formed in the top member for viewing the plurality of numerals on the base main member 1 through the large window in the between member 2. An example of how the device is used is shown in Fig. 1. The point 5 is placed at the numeral to be multiplied which is 12 seen through the window or hole 7 in the pointed portion. Then the small point 8 on the top member 3 is set at 2 on the base member to indicate the multiplier, the answer being 24.

From the foregoing it will appear that the device is adapted to multiply any numeral shown on the outer portion of the base member 1 by the multiplier indicated by the small point on the top member 3 being set at a numeral on the outer portion of the base number, the total showing in one of the windows of the top member 3 as a result of the positions of the plurality of numerals on the inner portion of the base member 1. The device shown will multiply any numeral 1 to 12 inclusive by any numeral 1 to 12 inclusive and show the total in one of the 12 windows in the top member 3 as a result of the positions of the numeral on the base member 1.

The device may be made of any material suitable for the purpose, but I prefer to use stiff cardboard. Also it may be made in different sizes and capacities depending on the purpose of its use.

While I have shown and described the preferred embodiment of my invention, I do not wish to limit same to the exact and precise details of structure, and reserve the right to make all modifications and changes so long as they remain within the scope of the invention and the following claim.

Having described my invention I claim:

A multiplying device of the character described comprising three generally circular members of flat stiff cardboard, one member being the base member and being larger in diameter than the second and third members which are substantially the same size in diameter, said base member having progressive numerals each representative of both a multiplicand and a multiplier factor around and spaced evenly apart on its outer peripheral portion, and having a plurality of progressive product numerals in circular array on its center portion, and an attaching hole in its center; said second member overlying said base member and being provided with a comparatively large window positioned between its center and its outer edge to restrictively expose a group of said product numerals on said base member corresponding to a selected multiplicand factor and having an integral pointed portion near said window, said pointed portion having a round hole as a window therein to exhibit said selected multiplicand factor, and having an attaching hole in its center; said third member overlying said second member and having a plurality of oblong shaped windows positioned apart in different relative radial and circular positions to expose a product numeral of said restrictively exposed group of product numerals corresponding to a selected multiplier factor, and an attaching hole in its center; a small bolt, said three members being held revolvably together by said small bolt through the said center holes in the three members.

References Cited in the file of this patent

UNITED STATES PATENTS

| | | |
|---|---|---|
| 809,294 | Fry | Jan. 9, 1906 |
| 1,453,100 | Fulgora | Apr. 24, 1923 |

FOREIGN PATENTS

| | | |
|---|---|---|
| 343,090 | Germany | Oct. 27, 1921 |
| 410,865 | Great Britain | May 31, 1934 |
| 170,134 | Switzerland | June 30, 1934 |